United States Patent
Huang et al.

(10) Patent No.: US 7,309,663 B2
(45) Date of Patent: Dec. 18, 2007

(54) ASYMMETRIC POROUS POLYTETRAFLUOROETHYLENE MEMBRANE FOR CLOTHING

(75) Inventors: James Huang, Taichung (TW); William Chou, Taichung (TW); David Chou, Taichung (TW); Juin-Yih Lai, Taoyuan (TW); Kueir-Rarn Lee, Taoyuan (TW); Da-Ming Wang, Taoyuan (TW); Ruoh-Chyu Ruaan, Taoyuan (TW); Tian-Tsair Wu, Taoyuan (TW)

(73) Assignee: Yeu Ming Tai Chemical Industrial Co., Ltd., Taichung (TW)

( * ) Notice: Subject to any disclaimer, the term of this patent is extended or adjusted under 35 U.S.C. 154(b) by 57 days.

(21) Appl. No.: 10/808,446

(22) Filed: Mar. 25, 2004

(65) Prior Publication Data

US 2004/0198121 A1   Oct. 7, 2004

(30) Foreign Application Priority Data

Apr. 2, 2003   (JP)   ............................. 2003-099358

(51) Int. Cl.
*B32B 27/12* (2006.01)
*B32B 27/04* (2006.01)
*B32B 27/32* (2006.01)

(52) U.S. Cl. ............................. 442/86; 442/64; 442/76; 442/152; 442/164; 442/221; 442/226; 442/286; 442/287; 442/290; 442/370; 442/394; 442/395; 442/398

(58) Field of Classification Search .................. 442/76, 442/86, 152, 287, 290, 64, 164, 221, 226, 442/286, 370, 394, 395, 398
See application file for complete search history.

(56) References Cited

U.S. PATENT DOCUMENTS

| | | | | |
|---|---|---|---|---|
| 3,953,566 A | * | 4/1976 | Gore | ........................... 264/505 |
| 4,187,590 A | * | 2/1980 | Harris et al. | ................... 24/453 |
| 4,234,535 A | | 11/1980 | Okita | ......................... 264/519 |

(Continued)

FOREIGN PATENT DOCUMENTS

EP   0516121   12/1992

(Continued)

OTHER PUBLICATIONS

Dictionary definition of "on" The American Heritage® Dictionary of the English Language, Fourth Edition Copyright © 2004, 2000 by Houghton Mifflin Company, no month.*
European Search Report dated Jul. 8, 2004.

*Primary Examiner*—Andrew Piziali
(74) *Attorney, Agent, or Firm*—Kratz, Quintos & Hanson, LLP

(57) ABSTRACT

The present invention provides an asymmetric porous PTFE membrane for clothing having little change over time and conventionally known properties of a porous PTFE molded article such as water permeability resistance, air permeability, sealing properties and electric properties, in which durability and water vapor permeability are improved by strengthening adhesion strength with fabric. Specifically, the present invention relates to an asymmetric porous PTFE membrane for clothing comprising a dense skin layer and a continuously foamed porous layer, wherein
(1) the contact angle of water to the surface of the skin layer is 120 to 140°; and
(2) the diffuse reflectance of light of the skin layer is 91 to 94%.

5 Claims, 2 Drawing Sheets

U.S. PATENT DOCUMENTS

| | | | |
|---|---|---|---|
| 4,248,924 A | 2/1981 | Okita | 428/212 |
| 4,332,035 A | 6/1982 | Mano | 3/1.4 |
| 4,863,788 A * | 9/1989 | Bellairs et al. | 442/374 |
| 4,973,609 A | 11/1990 | Browne | 521/81 |
| 5,026,591 A * | 6/1991 | Henn et al. | 428/198 |
| 5,162,149 A * | 11/1992 | Reaney | 428/315.5 |
| 5,382,223 A * | 1/1995 | Springs | 602/6 |
| 5,749,586 A * | 5/1998 | Abe et al. | 277/608 |
| 6,235,377 B1 | 5/2001 | Dillon et al. | 428/212 |
| 6,471,803 B1 * | 10/2002 | Pelland et al. | 156/64 |
| 2003/0089660 A1 | 5/2003 | Huang et al. | 210/500.36 |

FOREIGN PATENT DOCUMENTS

| | | |
|---|---|---|
| JP | 04-041778 | 2/1992 |
| JP | 04-353534 | 12/1992 |
| JP | 2002-172316 | 6/2002 |

* cited by examiner

ASYMMETRIC POROUS POLYTETRAFLUOROETHYLENE MEMBRANE FOR CLOTHING

BACKGROUND OF THE INVENTION

The present invention relates to an asymmetric porous polytetrafluoroethylene membrane for clothing and a material for clothing using the membrane as an air permeable and waterproof membrane.

Porous polytetrafluoroethylene membrane (hereinafter referred to as porous PTFE membrane) has excellent chemical resistance and high tensile strength and therefore is suitably used for a variety of purposes such as a filter for filtering gas and liquid, an agent for an air permeable and water impermeable membrane for clothing and a sheet for medical use, in addition to a sealing or gasket for piping and production facilities in the fields of chemicals, foods and semiconductors.

A process for preparing a porous PTFE membrane is disclosed (for example see U.S. Pat. No. 3,953,566, U.S. Pat. No. 3,962,153, U.S. Pat. No. 4,096,227, U.S. Pat. No. 4,187,390 and U.S. Pat. No. 4,902,423), in which PTFE paste, which is a mixture of PTFE fine powder and an extrusion aid such as naphtha, is extruded and then rolled. Then, after removing the extrusion aid from the rolled article, the article is drawn in a uniaxial or biaxial direction. Subsequently, to maintain the shape of the drawn porous PTFE membrane, heat-setting is conducted at a temperature between 35° C. and the melting point of PTFE.

However, the porous PTFE membrane obtained by the above method has excellent air permeability as a laminating agent for clothing material but there is the problem that lipid from the human body accumulates in the porous membrane, decreasing the air permeability properties.

In order to solve the above problem, disclosed is a material for clothing obtained by treating a porous PTFE membrane with a hydrophilic and air permeable material such as polyurethane (for example see U.S. Pat. No. 4,194,041). However, there are problems such as water vapor permeability is low and cleaning resistance is low.

Also, a method for laminating a porous PTFE membrane and fabric such as polyester and nylon is disclosed (for example see U.S. Pat. No. 5,026,591). However, adhesion strength between the materials is unsatisfactory and the problem of durability as material for clothing remains.

A material for clothing having satisfactory water resistance, air permeability, water vapor permeability and adhesion strength cannot be obtained with the symmetric porous PTFE membrane described above.

SUMMARY OF THE INVENTION

The object of the present invention is to provide an asymmetric porous PTFE membrane for clothing having little change over time and conventionally known properties of a porous PTFE molded article such as water permeability resistance, air permeability, sealing properties and electric properties, in which durability and water vapor permeability are improved by strengthening adhesion with fabric. The present invention also aims to provide a material for clothing using the membrane as an air permeable and waterproof membrane.

The conventionally known porous PTFE membrane is continuously foamed and with respect to the formed pores, the pore diameter distribution is homogenous on the surface and inside the membrane and the pores are formed homogeneously over the entire membrane (porosity is almost constant in the membrane). That is, the conventionally known porous PTFE membrane is symmetrically porous.

As a result of intensive studies, water resistance, air permeability and water vapor permeability of a porous PTFE membrane were found to improve by forming an asymmetric porous PTFE membrane, in which one face of the membrane comprises a dense PTFE skin layer and the other face comprises a low density continuously foamed porous layer.

That is, the present invention relates to an asymmetric porous PTFE membrane for clothing comprising a dense skin layer and a continuously foamed porous layer, wherein
(1) the contact angle of water to the surface of said skin layer is 120 to 140°; and
(2) the diffuse reflectance of light of said skin layer is 91 to 94%.

The asymmetric porous PTFE membrane for clothing is preferably obtained by drawing in a biaxial direction.

The thickness of the asymmetric porous PTFE membrane for clothing is preferably 10 to 100 μm.

The present invention also relates to a material for clothing comprising the asymmetric porous PTFE membrane for clothing and a woven or non-woven fabric.

The woven fabric is preferably polyester, nylon or cotton.

DETAILED DESCRIPTION

Figure 1:
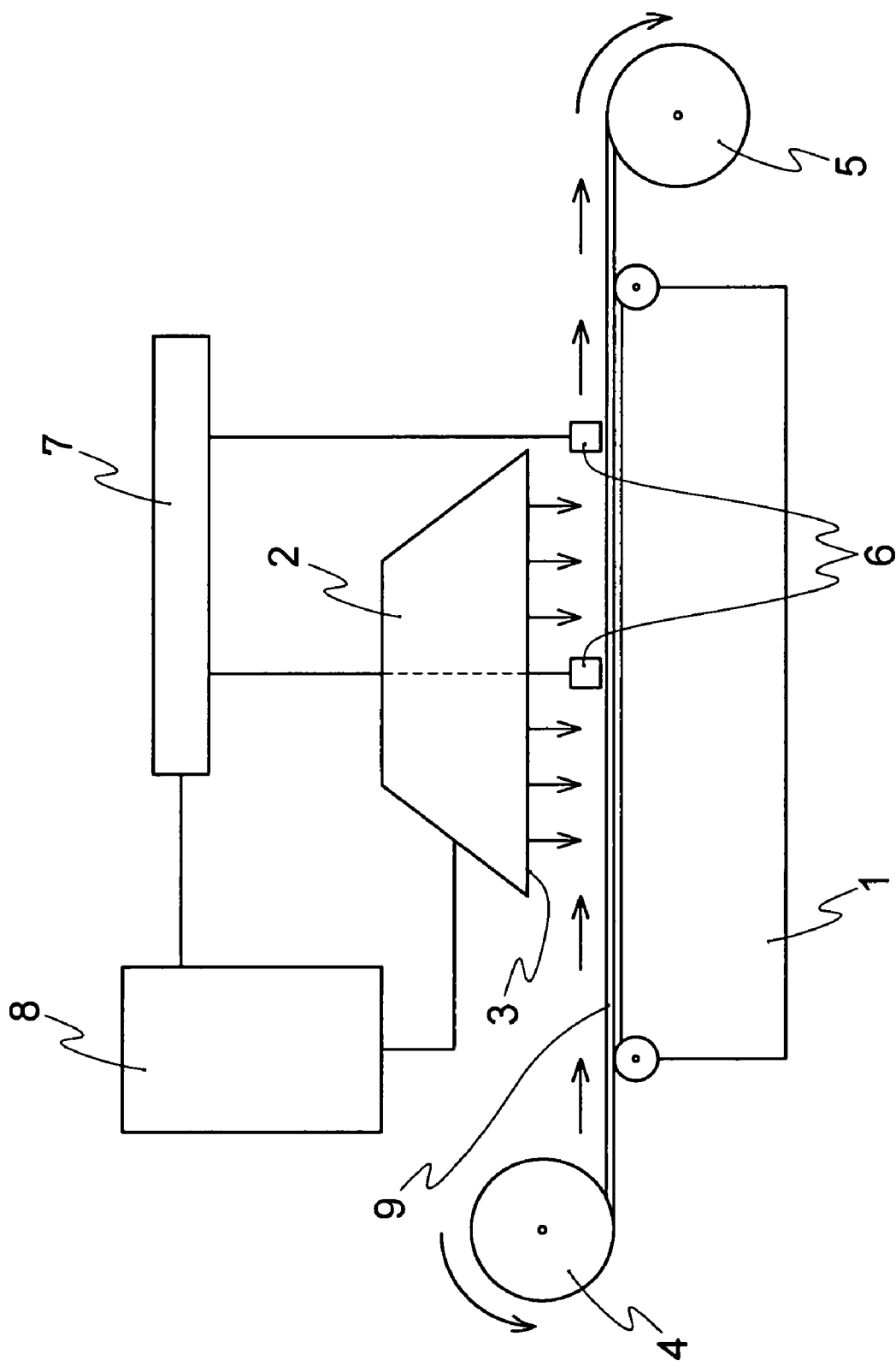
FIG. 1 is a schematic view depicting an example of the apparatus for thermal treatment.
Figure 2:
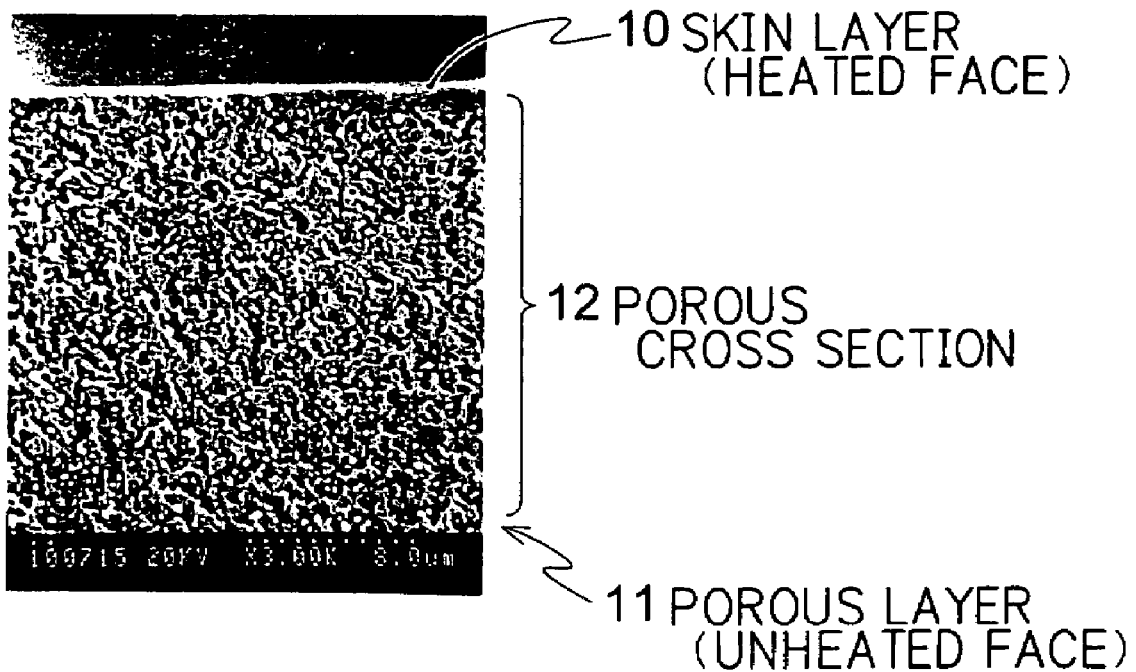
FIG. 2 is a SEM image (magnified 3000 times) of the cross section of an asymmetric porous PTFE membrane subjected to thermal treatment (340° C., 10 seconds) on one side. The upper white area is the dense layer (heated layer).

The drawn porous PTFE membrane used in the present invention can basically be prepared from the six known steps described below.

(1) Step of Extruding Paste of PTFE Fine Powder

A paste mixture of PTFE fine powder obtained by emulsion polymerization and an extrusion aid such as naphtha is extruded by an extruder to obtain an extruded article in the form of a cylinder, a rectangular column or a sheet.

The PTFE fine powder is powder obtained by coagulating an aqueous dispersion of a polymer obtained by emulsion polymerization to separate the polymer and then drying. The polymer is a tetrafluoroethylene (TFE) homopolymer or a copolymer of TFE and a small amount (usually at most 0.5% by weight) of perfluoroalkyl vinylether or hexafluoropropylene (modified PTFE).

In this step, orientation of the PTFE is preferably kept as low as possible, in order to smoothly carry out the next drawing step. Orientation can be kept low by suitably selecting the reduction ratio (preferably at most 300:1, usually 20:1 to 150:1), PTFE/extrusion aid ratio (usually 77/23 to 80/20) and die angle of the extruder (usually approximately 60°) when extruding the paste.

As the extrusion aid, usually mineral oil having high lubricating properties such as naphtha is used.

(2) Step of Rolling Paste Extruded Article

The patse extruded article obtained in step (1) is rolled in the extrusion direction or a direction orthogonal to the extrusion direction using a calender roll to prepare a sheet.

(3) Step of Removing Extrusion Aid

The extrusion aid is removed from the rolled sheet obtained in step (2) by heating or extracting with a solvent such as trichloroethane or trichloroethylene.

The heating temperature is selected depending on the kind of extrusion aid and is preferably 200° to 300° C., more preferably about 250° C. When the heating temperature is higher than 300° C., particularly higher than 327° C. which is the melting point of PTFE, the rolled sheet tends to be baked.

(4) Drawing Step

The rolled sheet from which the extrusion aid is removed obtained in step (3) is drawn. Drawing can be conducted in a uniaxial direction or a biaxial direction but drawing in a biaxial direction is preferable from the viewpoint of narrowing the distribution of pore diameter and obtaining porosity preferable for air permeability. Drawing in a biaxial direction can be conducted sequentially or simultaneously. Also, the rolled sheet may be pre-heated to approximately 300° C. before drawing.

The drawing ratio influences the tensile strength of the membrane and therefore should be carefully selected. The drawing ratio is preferably 300% to 2000%, more preferably 400% to 1500%. When the drawing ratio is out of this range, the desired pore diameter and porosity may not be obtained.

(5) Heat-Setting Step

The drawn sheet obtained in step (4) is heat-set by thermal treatment at a temperature range of 340 to 380° C., which is slightly higher than the melting point of PTFE (about 327° C.) but lower than the decomposition temperature of PTFE, for a relatively short period of time (5 to 15 seconds). When the temperature is lower than 340° C., heat-setting tends to be insufficient. When the temperature is higher than 380° C., the setting time becomes short and controlling the time tends to become difficult.

(6) Preparation of Asymmetric Porous PTFE Membrane

In the present invention, an asymmetric porous PTFE membrane is prepared by cooling one face of the drawn symmetric porous PTFE membrane obtained in the above manner while heating the other face and then cooling the heated face. An example of the equipment and process for preparing the porous PTFE membrane are depicted in FIG. 1 but the equipment and process are not limited thereto.

Below, the preparation process in the present invention is explained in detail with reference to FIG. 1.

The symmetric porous PTFE membrane heat-set and cooled in step (5) is delivered from delivery roll 4 and passed between heater 2 and cooling brine bath 1. The surface temperature of the PTFE membrane is measured by temperature sensor 6 and read by temperature reader 7. Then, the data regarding temperature is sent to heater controller 8 and based on the data, the temperature of hot air discharged from heater 2 via hot air discharge port 3 is controlled. Liquid for cooling is circulated in cooling brine bath 1 to maintain a constant temperature. The PTFE membrane passed through these units is wound onto wind roll 5 for the asymmetric porous PTFE membrane.

The thermal treatment temperature provided by heater 2 is preferably 260° to 380° C., more preferably 340° to 360° C. When the thermal treatment temperature is lower than 260° C., formation of the skin layer (dense layer) tends to be insufficient. When the thermal treatment temperature is higher than 380° C., controlling preparation of the asymmetric PTFE membrane becomes difficult and the entire membrane tends to become dense.

On the other hand, the cooling treatment temperature provided by cooling brine bath 1 is preferably at most 0° C., more preferably at most −10° C. When the cooling treatment temperature is more than 0° C., controlling preparation of the asymmetric PTFE membrane becomes difficult and the entire membrane tends to become dense, thereby decreasing air permeability.

The time for thermal treatment and cooling treatment is preferably 5 to 15 seconds, more preferably 6 to 10 seconds.

By cooling one face of the symmetric porous PTFE membrane heat-set by the above conditions, a continuously foamed porous layer is formed and by thermally treating the other face again at the same time, the membrane surface is modified to obtain an asymmetric porous PTFE membrane having a dense skin layer.

The dense layer refers to a layer, in which only one face of the membrane is modified to densify the porous structure further and which has properties different from the original symmetric porous PTFE membrane such as contact angle of water and diffuse reflectance of light. The continuously foamed layer refers to a layer having substantially the same porous structure as the symmetric porous PTFE membrane before thermal treatment.

Also, when 0.1 to 0.2 mL of an aqueous solution containing 60% of n-propylalcohol is dropped on the surface of the porous layer which is not thermally treated, the aqueous solution immediately permeates into the membrane and the white surface of the porous layer appears to be transparent. On the other hand, when the aqueous solution is dropped on the surface of the thermally treated and densified skin layer, the aqueous solution does not easily permeate and the dropped surface maintains the original whiteness.

The contact angle of water to the skin layer of the asymmetric porous PTFE membrane of the present invention is 120° to 140°, preferably 125° to 135°. When the contact angle is less than 120°, modification of the thermally treated face is insufficient and adhesion strength tends to decrease. When the contact angle is more than 140°, the skin layer is excessively densified and air permeability tends to decrease.

The contact angle of water to the asymmetric porous PTFE membrane is extremely high in comparison to the contact angle of water to a symmetric porous PTFE membrane (110° to 118°). This indicates that the skin layer of the asymmetric porous PTFE membrane of the present invention is superior in waterproof properties compared to a symmetric porous PTFE membrane.

Herein, the contact angle of water is found from the following equation.

$$\text{Contact angle} = 2 \tan^{-1}(h/r)$$

In the equation, h represents the height of a spherical water drop and r represents the radius of a spherical water drop.

The diffuse reflectance of light of the skin layer of the asymmetric porous PTFE membrane for clothing of the present invention is 91 to 94%. The diffuse reflectance is an index indicating the modified layer (skin layer). Diffuse reflectance of less than 91% indicates that densification is insufficient and diffuse reflectance of more than 94% indicates that densification is excessive. The reflectance is high in comparison to the diffuse reflectance of light of a symmetric porous PTFE membrane (90 to 91%).

According to SEM images, the asymmetric porous PTFE membrane of the present invention has a dense skin layer and a porous layer having a porous structure similar to that of a conventional symmetric porous PTFE membrane, while the conventional symmetric porous PTFE membrane has the same porous structure over the entire membrane. The porosity of the entire membrane is preferably 30 to 95%, more preferably 50 to 90%. When the porosity is less than 30%, air permeability tends to decrease and when the porosity is more than 95%, water resistance tends to decrease.

Herein, the porosity is found from the following equation by measurement of density.

Porosity (%)=[1−(PTFE apparent density/PTFE true density)]×100

In the equation, PTFE apparent density (g/cc)=weight (W)/volume (V) of the porous PTFE membrane and PTFE true density (g/cc)=2.15 (from literature).

The maximum pore diameter of the porous layer of the asymmetric porous PTFE membrane of the present invention is preferably 0.03 to 2 μm, more preferably 0.05 to 1 μm. When the maximum pore diameter is smaller than 0.03 μm, air permeability tends to decrease. When the maximum pore diameter is larger than 2 μm, water resistance tends to decrease.

Herein, the maximum pore diameter is calculated as follows.

First, the pore diameter and porous structure of the porous layer of the symmetric porous PTFE membrane and the asymmetric PTFE membrane obtained by thermally treating a symmetric porous PTFE membrane are confirmed to be unchanged before and after thermal treatment from SEM photographs (magnified 20,000 times). One feature of the present invention is that after thermal treatment, the pore diameter and the porous structure of the porous layer remain unchanged and only the skin layer is modified.

Next, the maximum pore diameter of the symmetric porous PTFE membrane is measured by a Porosimeter and the obtained value is considered to be the maximum pore diameter of the asymmetric porous PTFE membrane.

A membrane sample is placed in the sample chamber of the porosity measuring machine (Porosimeter PMI-1500, made by Porous Materials Inc.) and measurement is started in the automatic mode. As soon as measurement begins, gas (nitrogen gas) is introduced to one face of the membrane in the sample chamber. The introduction rate of the gas is controlled automatically.

While the pressure of the introduced gas is low, the membrane sample functions as a barrier and the pressure inside the chamber gradually rises continuously. When the sample loses barrier properties due to high pressure, the gas begins to permeate through the sample. The pressure of the sample chamber then ceases to increase and the pressure is measured at this point.

The above measurement of pressure was conducted for a dried membrane and a membrane moistened with Porewick solution to find pressure $P_1$ and $P_2$ of each.

The Porewick solution is the product name of a standard solution having surface tension adjusted to 16 dyn/cm, available from Porous Materials Inc.

The maximum pore diameter is found from the following equation.

$$d=C \cdot (\tau/\Delta P)$$

In the equation, d=the maximum pore diameter (μm), C=0.415, τ=surface tension (dyn/cm) of the moistening solution and $\Delta P=P_2-P_1$ (psi).

The thickness of the asymmetric porous PTFE membrane for clothing of the present invention depends on the targeted final product but is preferably 10 to 100 μm, more preferably 10 to 50 μm. When the membrane thickness is less than 10 μm, water resistance tends to decrease and when the thickness is more than 100 μm, texture tends to become poor for clothing products.

The thickness of the skin layer is preferably 0.04 to 40%, more preferably 0.1 to 30% of the total membrane thickness. When the thickness of the skin layer is less than 0.04% of the total membrane thickness, adhesion strength tends to decrease and when the thickness of the skin layer is more than 40%, texture tends to become poor for clothing products due to hardness.

A material for clothing using the asymmetric porous PTFE membrane for clothing of the present invention is described below.

The asymmetric porous PTFE membrane for clothing of the present invention can be used as material for clothing by laminating one side or both sides of the PTFE membrane with woven fabric or non-woven fabric and is preferable in that comfortable clothing material having excellent air permeability, water vapor permeability and waterproof properties can be obtained.

As the method for laminating, thermal fusion or a method of using an adhesive can be used but from the viewpoint of facilities and conditions of operation, the method of using an adhesive is preferable.

Examples of the woven fabric are polyester, nylon, cotton, aramid fiber cloth, polyacrylate and glass cloth. Of these, in view of light weight and texture as material for clothing, polyester, nylon and cotton are preferable.

Examples of non-woven fabric are non-woven fabric of polyethylene, polypropylene and polyester.

The thermally treated surface of the asymmetric porous PTFE membrane of the present invention has adhesion strength of 5 to 6 times that of a face which is not thermally treated and consequently the durability of clothing can be improved. Adhesion strength is measured according to JIS L 1096A.

The material for clothing using the asymmetric porous PTFE membrane for clothing of the present invention has excellent air permeability, water vapor permeability and water resistance and can provide clothing having high wearing comfort.

Hereinafter, the present invention is explained in detail based on Examples, but the present invention is not limited thereto.

<Pore Diameter>

The pore diameter was measured using SEM (MODEL S570, made by Hitachi, Ltd.).

<Porosity>

Weight (W) and volume (V) of the porous PTFE membrane were measured and porosity was found from the following equation.

Porosity (%)=[1−(PTFE apparent density/PTFE true density)]×100

In the equation, PTFE apparent density (g/cc)=W/V and PTFE true density (g/cc)=2.15 (from literature).

<Maximum Pore Diameter>

The maximum pore diameter was measured using a porosity measuring machine (Porosimeter PMI-1500, made by Porous Materials, Inc.) in the automatic mode.

A dried membrane and a membrane moistened with Porewick solution (available from Porous Materials, Inc.) was measured to find pressure $P_1$ and $P_2$ of each and the maximum pore diameter was found from the following equation.

$$d=C \cdot (\tau/\Delta P)$$

In the equation, d=maximum pore diameter (μm), C=0.415, τ=surface tension (dyn/cm) of the moistening solution and ΔP=$P_2$−$P_1$ (psi).

<Contact Angle of Water>

The contact angle of water was found from the following equation using a contact angle measuring machine CA-D made by Kyowa Interface Science Co., Ltd.

Contact angle=2 tan$^{-1}$ (h/r)

In the equation, h=height of a spherical water drop and r=radius of a spherical water drop.

<Diffuse Reflectance of Light>

Diffuse reflectance was measured according to ASTM E308 (wavelength 400 to 700 nm) using Mini Scan XE Plus (made by The Color Management Company).

<Tensile Strength of Membrane>

Tensile strength was measured according to ASTM D-1456.

<Elongation at Break of Membrane>

Elongation at break was measured according to ASTM D-1456.

<Adhesion Strength>

Adhesion strength was measured according to JIS L-1096A.

<Water Vapor Permeability>

Water vapor permeability was measured according to JIS L-1099.

<Air Permeability>

Air permeability was measured according to ASTM D-726.

<Dry Cleaning Test>

Dry cleaning test was conducted according to JIS L-0860.

EXAMPLES 1 TO 3

A paste mixture containing 80 parts of PTFE fine powder prepared by emulsion polymerization and 20 parts of naphtha was extruded using an extruder at a reduction ratio of 80:1 to obtain a rod-shaped extruded article having a diameter of 18 mm. The rod-shaped extruded article was rolled in the extrusion direction using a calender roll having a diameter of 500 mm to obtain a rolled sheet having a width of 260 mm and thickness of 0.2 mm. The sheet was then heated to 260° C. in an oven to remove naphtha. Thereafter, the sheet was pre-heated to 300° C. and simultaneously drawn in a biaxial direction to a drawing ratio of 500% in the rolling direction and a drawing ratio of 300% in a direction orthogonal to the rolling direction. Maintaining this drawn state, the sheet was heat-set by heating at 340° C. for 15 seconds. The sheet was then cooled to room temperature to obtain a symmetric porous PTFE membrane having a thickness of 20 to 25 μm, a maximum pore diameter of 0.5 μm and a porosity of 90%.

Then, one face of the symmetric porous PTFE membrane was treated with the thermal treatment apparatus of FIG. 1, wherein the temperature of cooling brine bath 1 was maintained at −10° C., the temperature of hot air discharged from heater 2 via hot air discharge port 3 was respectively adjusted to 260° C., 300° C. and 340° C., and the time for the membrane to pass through the hot air discharge port area was adjusted to 7 seconds, to obtain an asymmetric porous PTFE membrane. The evaluation results are shown in Table 1.

COMPARATIVE EXAMPLE 1

The symmetric porous PTFE membrane obtained in Example 1 was used. The evaluation results are shown in Table 1.

TABLE 1

| | Thermal Treatment Temperature (° C.) | Membrane Thickness (μm) | Porosity (%) | Pore Diameter (μm) | Contact Angle of Water (°) | Light Reflectance (%) | Adhesion Strength (g/cm) | Tensile Strength of Membrane (MPa) | Elongation at Break of Membrane (%) |
|---|---|---|---|---|---|---|---|---|---|
| Ex. 1 | 260 | 20 | 85.8 | 0.09 to 0.17 | 128 | 92.4 | 268.0 | 5.96 | 109 |
| Ex. 2 | 300 | 23 | 89.8 | 0.08 to 0.15 | 129 | 92.6 | 271.6 | 7.3 | 134 |
| Ex. 3 | 340 | 25 | 90.9 | 0.09 to 0.19 | 131 | 93.8 | 319.0 | 8.5 | 107 |
| Com. Ex. 1 | — | 25 | 89.7 | 0.10 to 0.19 | 117 | 90.8 | 51.6 | 5.07 | 166 |

EXAMPLES 4 TO 6

A blend fabric of polyester and cotton (50%/50%) having a thickness of approximately 0.1 mm was laminated on one face of the asymmetric porous PTFE membrane obtained in Examples 1 to 3 to obtain a material for clothing. Lamination was conducted by applying hot melt-type polyurethane having water vapor permeability as the adhesive to the skin layer of the asymmetric porous PTFE membrane, adhering the blend fabric thereon and curing the polyurethane adhesive. The water vapor permeability and air permeability before and after dry cleaning were evaluated and the results are shown in Table 2.

COMPARATIVE EXAMPLE 1

A material for clothing was obtained in the same manner as in Examples 4 to 6 using the symmetric porous PTFE membrane obtained in Comparative Example 1. The evaluation results are shown in Table 2.

TABLE 2

| | Before Dry Cleaning | | After Dry Cleaning | |
|---|---|---|---|---|
| | Water Vapor Permeability* (g/m$^2$) | Air Permeability (×10$^4$ ft$^3$/ min · ft$^2$) | Water Vapor Permeability* (g/m$^2$) | Air Permeability (×10$^4$ ft$^3$/ min · ft$^2$) |
| Ex. 4 | 15250 | 25 | 21400 | 23 |
| Ex. 5 | 11095 | 13 | 19300 | 21 |

TABLE 2-continued

| | Before Dry Cleaning | | After Dry Cleaning | |
|---|---|---|---|---|
| | Water Vapor Permeability* $(g/m^2)$ | Air Permeability $(\times 10^4 \, ft^3/ min \cdot ft^2)$ | Water Vapor Permeability* $(g/m^2)$ | Air Permeability $(\times 10^4 \, ft^3/ min \cdot ft^2)$ |
| Ex. 6 | 16200 | 12 | 18500 | 17 |
| Com. Ex. 2 | 8440 | 8.7 | 9410 | 8 |

*Represents water vapor permeability per day.

According to the present invention, an asymmetric porous PTFE membrane for clothing can be obtained, which is excellent in air permeability, water vapor permeability and water resistance. Furthermore, a material for clothing using the asymmetric porous PTFE membrane has excellent air permeability, water vapor permeability and water resistance and can provide clothing having high wearing comfort.

What is claimed is:

1. An air permeable and waterproof membrane for clothing comprising:
   an asymmetric porous polytetrafluoroethylene membrane for clothing and
   a woven or non-woven fabric,
   wherein said asymmetric porous polytetrafluoroethylene membrane for clothing has a dense skin layer and a continuously foamed porous layer; and the dense skin layer has an outer surface and an inner surface, the inner surface being the surface directly next to the porous layer, and the outer surface of the porous layer does not have an adhesive layer;
   (1) the contact angle of water to the surface of said skin layer is 120 to 140°;
   (2) the diffuse reflectance of light of said skin layer is 91 to 94%; and,
   the woven or non-woven fabric is laminated on the outer surface of the dense skin layer of said asymmetric porous polytetrafluoroethylene membrane for clothing.

2. The material for clothing of claim 1, wherein said woven fabric is polyester, nylon or cotton.

3. The material for clothing of claim 1, wherein said asymmetric porous polytetrafluoroethylene membrane for clothing is obtained by drawing in a biaxial direction.

4. The material for clothing of claim 1, wherein said asymmetric porous polytetrafluoroethylene membrane for clothing has a membrane thickness of 10 to 100 µm.

5. The material for clothing of claim 3, wherein said asymmetric porous polytetrafluoroethylene membrane for clothing has a membrane thickness of 10 to 100 µm.

* * * * *